(12) United States Patent
Susser et al.

(10) Patent No.: US 7,200,842 B1
(45) Date of Patent: Apr. 3, 2007

(54) OBJECT-ORIENTED INSTRUCTION SET FOR RESOURCE-CONSTRAINED DEVICES

(75) Inventors: Joshua B. Susser, San Francisco, CA (US); Judith E. Schwabe, San Mateo, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/243,101

(22) Filed: Feb. 2, 1999

(51) Int. Cl.
*G06F 9/45* (2006.01)
(52) U.S. Cl. ..................................... 717/159
(58) Field of Classification Search ........ 717/136–167, 717/174–178, 108, 110–118, 126, 134; 711/6, 711/208; 713/187; 709/1, 203; 705/21, 705/67

See application file for complete search history.

(56) References Cited

U.S. PATENT DOCUMENTS

| | | | | |
|---|---|---|---|---|
| 5,107,451 A | | 4/1992 | Houk | 364/746 |
| 5,668,999 A | | 9/1997 | Gosling | 717/126 |
| 5,724,279 A | * | 3/1998 | Benaloh et al. | 708/491 |
| 5,732,263 A | | 3/1998 | Havens et al. | 717/103 |
| 5,778,231 A | | 7/1998 | van Hoff et al. | 717/143 |
| 5,825,407 A | * | 10/1998 | Cowe et al. | 725/143 |
| 5,999,731 A | * | 12/1999 | Yellin et al. | 717/126 |
| 5,999,732 A | * | 12/1999 | Bak et al. | 717/148 |
| 6,092,147 A | * | 7/2000 | Levy et al. | 711/6 |
| 6,151,618 A | * | 11/2000 | Wahbe et al. | 718/1 |
| 6,195,700 B1 | | 2/2001 | Bender et al. | |
| 6,233,683 B1 | * | 5/2001 | Chan et al. | 713/172 |
| 6,247,174 B1 | * | 6/2001 | Santhanam et al. | 717/154 |
| 6,272,674 B1 | | 8/2001 | Holiday, Jr. | |
| 6,308,317 B1 | * | 10/2001 | Wilkinson et al. | 717/139 |
| 6,332,215 B1 | * | 12/2001 | Patel et al. | 717/141 |
| 6,339,820 B1 | | 1/2002 | Baentsch et al. | |
| 6,349,344 B1 | | 2/2002 | Sauntry et al. | |
| 6,363,523 B1 | | 3/2002 | Chen et al. | 717/9 |
| 2001/0000814 A1 | * | 5/2001 | Montgomery et al. | 710/10 |
| 2002/0023954 A1 | * | 2/2002 | Calder et al. | 235/381 |
| 2003/0023954 A1 | * | 1/2003 | Wilkinson et al. | 717/118 |
| 2003/0028572 A1 | | 2/2003 | Hoskote et al. | 708/495 |

OTHER PUBLICATIONS

No Author, "Java Card Virtual Machine Specification", Jan. 1999, Sun Microsystems, Draft 2a, Java Card Version 2.1.*
Ramnarayan Jags, "cs510jip Compressed Data Loader", Jags_report, May 21, 1998, pp. 1-9, <http://www.cs.pdx.edu/~apt/cs510jip_1998/jags_report/report.html>.*

(Continued)

*Primary Examiner*—Kakali Chaki
*Assistant Examiner*—Tuan A. Vu
(74) *Attorney, Agent, or Firm*—Gunnison, McKay & Hodgson, L.L.P.; Forrest Gunnison

(57) ABSTRACT

A resource-constrained device such as a smart card or the like includes memory for storing an application software program comprising an object-oriented, verifiable, platform-independent, type-safe and pointer-safe sequence of instructions. The device can also include a virtual machine implemented on a microprocessor where the virtual machine is capable of executing the sequence of instructions. Each instruction includes an operation code, and each data manipulation instruction is specific to a particular data type. The application program can be stored on a computer-readable medium prior to being received by the resource-constrained device. Methods of using such an application program, including accessing the program over the Internet and downloading it to a smart card, also are disclosed.

69 Claims, 14 Drawing Sheets aload _ 0
getfield _ a
<index> getfield _ a _ this
<index>

OTHER PUBLICATIONS

Ritchey, Tim, "Advanced Topics: The Java Virtual Machine" *Java!*, Chapter 14, pp. 25-346, Sep. 22, 1995.

Sun Microsystems, Inc., "Java Card™ 2.0 Language Subset and Virtual Machine Specification", Oct. 13, 1997, Revision 1.0 Final.

Sun Microsystems, Inc., "Java Card™ 2.0 Programming Concepts", Oct. 15, 1997, Revision 1.0 Final.

"Sun Microsystems Announces JAVACARD API", Business Wire, Oct. 1996.

"*Multi-Threaded Buffer Management Method Analyzers*", IBM Technical Disclosure Bulletin, vol. 37, issue 10, pp. 509-512, Oct. 1, 1994.

Microsoft Press "*Computer Dictionary*", Third Edition, pp. 26 & 112, 1997.

Copyright © Schlumberger 1997-1998, Cyberflex™ Access, Jan. 15, 1999, from http://www.cyberflex.slb.com, 2 pages.

© 1998 Schlumberger Limited, "Java Developer's Journal Names Cyberflex Smart Card As Editor's Choice Finalist", Jan. 11, 1999, from http://www.slb.com/ir/news/sct-jdj0199.html, 3 pages.

Copyright © Schlumberger 1997-1998, "Schlumberger Announces Cyberflex Access; Java™ Based Smart Card Combines Multiple Application and Cryptographic Features for Information Security Market", Dec. 8, 1998, from http://www.cyberflex.slb.com/Ac...ex_Access/cyberflex_access.html, 2 pages.

Copyright © 1995-99 Sun Microsystems, Inc., "The Source for Java™ Technology, java.sun.com, What is the embedddJava™ Application Environment", Jan. 27, 1999, from http://java.sun.com/products/embeddedjava/overview.html, 2 pages.

Scott B. Guthery, Java Card: Internet Computing on a Smart Card, Jan. 1997, IEEE Internet Computing, Online vol. 1, No. 1.

Chen et al., Understanding Java Card 2.0, Mar. 1998, Java World Online.

Julian Dolby, Automatic Inline Allocation of Objects, Jun. 1997, ACM SIGPLAN 1997 Conference on Programming Language Design and Implementation, Las Vegas, NV.

Java Card™ 2.1 Virtual Machine Specification Final Revision 1.1., Jun. 1999, Sun Microsystems, Inc.

\* cited by examiner

INSTRUCTION

```
do  {
        fetch an opcode;
        if (operands) fetch operands;
        execute the action for the opcode;
    } while (there are more opcodes);
```

| | | | | | | | | |
|---|---|---|---|---|---|---|---|---|
| 0 | nop | 47 | sstore_0 | 94 | i2s | 141 | invokestatic |
| 1 | aconst_null | 48 | sstore_1 | 95 | icmp | 142 | invokeinterface |
| 2 | sconst_m1 | 49 | sstore_2 | 96 | ifeq | 143 | new |
| 3 | sconst_0 | 50 | sstore_3 | 97 | ifne | 144 | newarray |
| 4 | sconst_1 | 51 | istore_0 | 98 | iflt | 145 | anewarray |
| 5 | sconst_2 | 52 | istore_1 | 99 | ifge | 146 | arraylength |
| 6 | sconst_3 | 53 | istore_2 | 100 | ifgt | 147 | athrow |
| 7 | sconst_4 | 54 | istore_3 | 101 | ifle | 148 | checkcast |
| 8 | sconst_5 | 55 | aastore | 102 | ifnull | 149 | instanceof |
| 9 | iconst_m1 | 56 | bastore | 103 | ifnonnull | 150 | sinc_w |
| 10 | iconst_0 | 57 | sastore | 104 | if_acmpeq | 151 | iinc_w |
| 11 | iconst_1 | 58 | iastore | 105 | if_acmpne | 152 | ifeq_w |
| 12 | iconst_2 | 59 | pop | 106 | if_scmpeq | 153 | ifne_w |
| 13 | iconst_3 | 60 | pop2 | 107 | if_scmpne | 154 | iflt_w |
| 14 | iconst_4 | 61 | dup | 108 | if_scmplt | 155 | ifge_w |
| 15 | iconst_5 | 62 | dup2 | 109 | if_scmpge | 156 | ifgt_w |
| 16 | bspush | 63 | dup_x | 110 | if_scmpgt | 157 | ifle_w |
| 17 | sspush | 64 | swap_x | 111 | if_scmple | 158 | ifnull_w |
| 18 | bipush | 65 | sadd | 112 | goto | 159 | ifnonnull_w |
| 19 | sipush | 66 | iadd | 113 | jsr | 160 | if_acmpeq_w |
| 20 | iipush | 67 | ssub | 114 | ret | 161 | if_acmpne_w |
| 21 | aload | 68 | isub | 115 | stableswitch | 162 | if_scmpeq_w |
| 22 | sload | 69 | smul | 116 | itableswitch | 163 | if_scmpne_w |
| 23 | iload | 70 | imul | 117 | slookupswitch | 164 | if_scmplt_w |
| 24 | aload_0 | 71 | sdiv | 118 | ilookupswitch | 165 | if_scmpge_w |
| 25 | aload_1 | 72 | idiv | 119 | areturn | 166 | if_scmpgt_w |
| 26 | aload_2 | 73 | srem | 120 | sreturn | 167 | if_scmple_w |
| 27 | aload_3 | 74 | irem | 121 | ireturn | 168 | goto_w |
| 28 | sload_0 | 75 | sneg | 122 | return | 169 | getfield_a_w |
| 29 | sload_1 | 76 | ineg | 123 | getstatic_a | 170 | getfield_b_w |
| 30 | sload_2 | 77 | sshl | 124 | getstatic_b | 171 | getfield_s_w |
| 31 | sload_3 | 78 | ishl | 125 | getstatic_s | 172 | getfield_i_w |
| 32 | iload_0 | 79 | sshr | 126 | getstatic_i | 173 | getfield_a_this |
| 33 | iload_1 | 80 | ishr | 127 | putstatic_a | 174 | getfield_b_this |
| 34 | iload_2 | 81 | sushr | 128 | putstatic_b | 175 | getfield_s_this |
| 35 | iload_3 | 82 | iushr | 129 | putstatic_s | 176 | getfield_i_this |
| 36 | aaload | 83 | sand | 130 | putstatic_i | 177 | putfield_a_w |
| 37 | baload | 84 | iand | 131 | getfield_a | 178 | putfield_b_w |
| 38 | saload | 85 | sor | 132 | getfield_b | 179 | putfield_s_w |
| 39 | iaload | 86 | ior | 133 | getfield_s | 180 | putfield_i_w |
| 40 | astore | 87 | sxor | 134 | getfield_i | 181 | putfield_a_this |
| 41 | sstore | 88 | ixor | 135 | putfield_a | 182 | putfield_b_this |
| 42 | istore | 89 | sinc | 136 | putfield_b | 183 | putfield_s_this |
| 43 | astore_0 | 90 | iinc | 137 | putfield_s | 184 | putfield_i_this |
| 44 | astore_1 | 91 | s2b | 138 | putfield_i | | ... |
| 45 | astore_2 | 92 | s2i | 139 | invokevirtual | 254 | impdep1 |
| 46 | astore_3 | 93 | i2b | 140 | invokespecial | 255 | impdep2 |

FIG. 4A

| | | | | | | | |
|---|---|---|---|---|---|---|---|
| aaload | 36 | iand | 84 | iload_0 | 32 | putstatic_s | 129 |
| aastore | 55 | iastore | 58 | iload_1 | 33 | ret | 114 |
| aconst_null | 1 | icmp | 95 | iload_2 | 34 | return | 122 |
| aload | 21 | iconst_0 | 10 | iload_3 | 35 | s2b | 91 |
| aload_0 | 24 | iconst_1 | 11 | ilookupswitch | 118 | s2i | 92 |
| aload_1 | 25 | iconst_2 | 12 | imul | 70 | sadd | 65 |
| aload_2 | 26 | iconst_3 | 13 | ineg | 76 | saload | 38 |
| aload_3 | 27 | iconst_4 | 14 | instanceof | 149 | sand | 83 |
| anewarray | 145 | iconst_5 | 15 | invokeinterface | 142 | sastore | 57 |
| areturn | 119 | iconst_m1 | 9 | invokespecial | 140 | sconst_0 | 3 |
| arraylength | 146 | idiv | 72 | invokestatic | 141 | sconst_1 | 4 |
| astore | 40 | if_acmpeq | 104 | invokevirtual | 139 | sconst_2 | 5 |
| astore_0 | 43 | if_acmpeq_w | 160 | ior | 86 | sconst_3 | 6 |
| astore_1 | 44 | if_acmpne | 105 | irem | 74 | sconst_4 | 7 |
| astore_2 | 45 | if_acmpne_w | 161 | ireturn | 121 | sconst_5 | 8 |
| astore_3 | 46 | if_scmpeq | 106 | ishl | 78 | sconst_m1 | 2 |
| athrow | 147 | if_scmpeq_w | 162 | ishr | 80 | sdiv | 71 |
| baload | 37 | if_scmpge | 109 | istore | 42 | sinc | 89 |
| bastore | 56 | if_scmpge_w | 165 | istore_0 | 51 | sinc_w | 150 |
| bipush | 18 | if_scmpgt | 110 | istore_1 | 52 | sipush | 19 |
| bspush | 16 | if_scmpgt_w | 166 | istore_2 | 53 | sload | 22 |
| checkcast | 148 | if_scmple | 111 | istore_3 | 54 | sload_0 | 28 |
| dup | 61 | if_scmple_w | 167 | isub | 68 | sload_1 | 29 |
| dup_x | 63 | if_scmplt | 108 | itableswitch | 116 | sload_2 | 30 |
| dup2 | 62 | if_scmplt_w | 164 | iushr | 82 | sload_3 | 31 |
| getfield_a | 131 | if_scmpne | 107 | ixor | 88 | slookupswitch | 117 |
| getfield_a_this | 173 | if_scmpne_w | 163 | jsr | 113 | smul | 69 |
| getfield_a_w | 169 | ifeq | 96 | new | 143 | sneg | 75 |
| getfield_b | 132 | ifeq_w | 152 | newarray | 144 | sor | 85 |
| getfield_b_this | 174 | ifge | 99 | nop | 0 | srem | 73 |
| getfield_b_w | 170 | ifge_w | 155 | pop | 59 | sreturn | 120 |
| getfield_i | 134 | ifgt | 100 | pop2 | 60 | sshl | 77 |
| getfield_i_this | 176 | ifgt_w | 156 | putfield_a | 135 | sshr | 79 |
| getfield_i_w | 172 | ifle | 101 | putfield_a_this | 181 | sspush | 17 |
| getfield_s | 133 | ifle_w | 157 | putfield_a_w | 177 | sstore | 41 |
| getfield_s_this | 175 | iflt | 98 | putfield_b | 136 | sstore_0 | 47 |
| getfield_s_w | 171 | iflt_w | 154 | putfield_b_this | 182 | sstore_1 | 48 |
| getstatic_a | 123 | ifne | 97 | putfield_b_w | 178 | sstore_2 | 49 |
| getstatic_b | 124 | ifne_w | 153 | putfield_i | 138 | sstore_3 | 50 |
| getstatic_i | 126 | ifnonnull | 103 | putfield_i_this | 184 | ssub | 67 |
| getstatic_s | 125 | ifnonnull_w | 159 | putfield_i_w | 180 | stableswitch | 115 |
| goto | 112 | ifnull | 102 | putfield_s | 137 | sushr | 81 |
| goto_w | 168 | ifnull_w | 158 | putfield_s_this | 183 | swap_x | 64 |
| i2b | 93 | iinc | 90 | putfield_s_w | 179 | sxor | 87 |
| i2s | 94 | iinc_w | 151 | putstatic_a | 127 | | |
| iadd | 66 | iipush | 20 | putstatic_b | 128 | | |
| iaload | 39 | iload | 23 | putstatic_i | 130 | | |

FIG. 4B

| opcode | byte | short | int | reference |
|---|---|---|---|---|
| Tspush | bspush | sspush | | |
| Tipush | bipush | sipush | iipush | |
| Tconst | | sconst | iconst | aconst |
| Tload | | sload | iload | aload |
| Tstore | | sstore | istore | astore |
| Tinc | | sinc | iinc | |
| Taload | baload | saload | iaload | aaload |
| Tadd | | sadd | iadd | |
| Tsub | | ssub | isub | |
| Tmul | | smul | imul | |
| Tdiv | | sdiv | idiv | |
| Trem | | srem | irem | |
| Tneg | | sneg | ineg | |
| Tshl | | sshl | ishl | |
| Tshr | | sshr | ishr | |
| Tushr | | sushr | iushr | |
| Tand | | sand | iand | |
| Tor | | sor | ior | |
| Txor | | sxor | icor | |
| s2T | s2b | | s2i | |
| i2T | i2b | i2s | | |
| Tcmp | | | icmp | |
| if_TcmpOP | | if_scmpOP | | if_acmpOP |
| Tlookupswitch | | slookupswitch | ilookupswitch | |
| Ttableswitch | | stableswitch | itableswitch | |
| Treturn | | sreturn | ireturn | areturn |
| getstatic_T | getstatic_b | getstatic_s | getstatic_i | getstatic_a |
| putstatic_T | putstatic_b | putstatic_s | putstatic_i | putstatic_a |
| getfield_T | getfield_b | getfield_s | getfield_i | getfield_a |
| putfield_T | putfield_b | putfield_s | putfield_i | putfield_a |

FIG. 5

| iipush | (Java Card™ Virtual Machine) |
|---|---|
| Operation: | Push integer onto stack |

Format:

| iipush |
|---|
| byte1 |
| byte2 |
| byte3 |
| byte4 |

Form: iipush = 20 (0x14)

FIG. 6A

| ldc | (Java™ Virtual Machine) |
|---|---|
| Operation: | Push item onto stack |

Format:

| ldc |
|---|
| index |

Form: ldc = 18 (0x12)

FIG. 6B checkcast (Java™ Virtual Machine)

Operation Check whether object is of a given type

Format

| checkcast |
|---|
| indexbyte1 |
| indexbyte2 |

Form checkcast = 192 (0xC0)

FIG. 7A checkcast (Java Card™ Virtual Machine)

Operation check whether object is of a given type

Format

| checkcast |
|---|
| atype |
| indexbyte1 |
| indexbyte2 |

Form checkcast = 148 (0x94)

FIG. 7B getfield _ T  (Java Card™ Virtual Machine)

Operation  Fetch field from object

Format

| getfield _ T |
|---|
| index |

Forms  getfield _ a = 131 (0x83)
getfield _ b = 132 (0x84)
getfield _ s = 133 (0x85)
getfield _ i = 134 (0x86)

FIG. 8A getfield  (Java™ Virtual Machine)

Operation  Fetch field from object

Format

| getfield |
|---|
| indexbyte1 |
| indexbyte2 |

Form  getfield = 180 (0xb4)

FIG. 8B

```
iload
<a>
iload
<b>
iadd
i2s
istore
```

FIG. 11A

```
sload
<a>
sload
<b>
sadd
sstore
```

FIG. 11B smart cards cellular telephones boundary scan devices field programmable devices PDAs pagers other small or miniature devices

OBJECT-ORIENTED INSTRUCTION SET FOR RESOURCE-CONSTRAINED DEVICES

A portion of the disclosure of this patent document contains material which is subject to copyright protection. The copyright owner has no objection to the facsimile reproduction by anyone of the patent disclosure as it appears in the Patent and Trademark Office patent files or records, but otherwise reserves all copyright rights whatsoever.

CROSS REFERENCE TO RELATED APPLICATIONS

U.S. patent application Ser. No. 09/243,107, filed Feb. 2, 1999, in the names of inventors Judith E. Schwabe and Joshua Susser, entitled "Zero Overhead Exception Handling", commonly assigned herewith, now issued as U.S. Pat. No. 6,848,111;

U.S. patent application Ser. No. 09/243,108, filed Feb. 2, 1999, in the names of inventors Judith E. Schwabe and Joshua Susser, entitled "Token-Based Linking", commonly assigned herewith, now issued as U.S. Pat. No. 6,880,155;

BACKGROUND

The present invention relates, in general, to object-oriented, architecture-neutral programs for use with resource-constrained devices such as smart cards and the like.

A virtual machine is an abstract computing machine generated by a software application or sequence of instructions which is executed by a processor. The term "architecture-neutral" refers to programs, such as those written in the Java™ programming language, which can be executed by a virtual machine on a variety of computer platforms having a variety of different computer architectures. Thus, for example, a virtual machine being executed on a Windows™-based personal computer system will use the same set of instructions as a virtual machine being executed on a UNIX™-based computer system. The result of the platform-independent coding of a virtual machine's sequence of instructions is a stream of one or more bytecodes, each of which is, for example, a one-byte-long numerical code.

Use of the Java programming language has found many applications including, for example, those associated with Web browsers.

The Java programming language is object-oriented. In an object-oriented system, a "class" describes a collection of data and methods that operate on that data. Taken together, the data and methods describe the state of and behavior of an object.

Java also is verifiable such that, prior to execution of an application written in the Java programming language, a determination can be made as to whether any instruction sequence in the program will attempt to process data of an improper type for that bytecode or whether execution of bytecode instructions in the program will cause underflow or overflow of an operand stack.

A Java™ virtual machine executes virtual machine code written in the Java programming language and is designed for use with a 32-bit architecture. However, various resource-constrained devices, such as smart cards, have an 8-bit or 16-bit architecture.

Smart cards, also known as intelligent portable data-carrying cards, generally are made of plastic or metal and have an electronic chip that includes an embedded microprocessor to execute programs and memory to store programs and data. Such devices, which can be about the size of a credit card, typically have limited memory capacity. For example, some smart cards have less than one kilo-byte (1K) of random access memory (RAM) as well as limited read only memory (ROM), and/or non-volatile memory such as electrically erasable programmable read only memory (EEPROM). The limited architecture and memory make it impractical or impossible to implement the full Java Virtual Machine on the device.

Furthermore, smart cards come with a variety of processors and configurations. Thus, it is desirable to provide a platform-independent programming language that can be executed on such a resource-constrained device.

SUMMARY

In general, a verifiable, object-based, type-safe and pointer-safe instruction set is described for application software programs which can be downloaded to and executed on a range of resource-constrained devices.

According to one aspect, an application software program includes an object-oriented, verifiable, type-safe and pointer-safe sequence of instructions residing on a computer-readable medium. The program can be loaded to and executed by a resource-constrained device that is based on an architecture of fewer than 32 bits, such as a 16-bit or 8-bit architecture.

According to another aspect, an application software program includes an object-oriented, verifiable, type-safe and pointer-safe sequence of instructions residing on a computer-readable medium. The program can be loaded to and executed by a resource-constrained device having random access memory with a capacity of no more than about 64K.

Various implementations include one or more of the following features. For example, each instruction can include an 8-bit operation code, and the sequence of instructions can be hardware platform-independent. In some implementations, the sequence includes instructions that were previously converted from at least one Java class file with at least some references to a constant pool transformed to inline data. For example, the instructions can include operation codes and operands. Some references to the constant pool can be inlined into operands, and some references to the constant pool can be inlined into operation codes.

Similarly, in some embodiments, the instructions can be executed by a device that supports multiple data types. The sequence of instructions can include data manipulation instructions each of which is specific to a particular data type. In some implementations, the data type associated with each data manipulation instruction is selected from among one of the following types: an 8-bit signed two's complement integer numeric type, a 16-bit signed two's complement integer numeric type and a 32-bit signed two's complement integer numeric type. Additionally, the instructions can be executed by a device that supports multiple reference types each of which is selected from among one of the following types: a class type, an interface type and an array type. Furthermore, the program can include one or more composite instructions for performing an operation on a current object.

According to another aspect, a resource-constrained device includes memory for storing an application software program comprising an object-oriented, verifiable, type-safe and pointer-safe sequence of instructions. The device also includes a virtual machine implemented on a microprocessor. The virtual machine is capable of executing the sequence of instructions. In various embodiments, the device may be based on a limited architecture or may have a limited amount of memory. For example, in some implementations, the device includes random access memory having a capacity of no more than about 64K. In other embodiments, the microprocessor is based on an architecture of less than 32 bits, for example, a 16 or 8-bit architecture.

In other embodiments, an application-specific integrated circuit (ASIC) or a combination of a hardware and firmware can be used instead of a virtual machine running on a microprocessor.

In one particular application of the invention, the resource-constrained device is a smart card. The smart card can include a virtual machine implemented on a microprocessor, wherein the virtual machine is capable of executing a sequence of instructions such as those described above.

According to another aspect, methods are disclosed for using an application software program including an object-oriented, verifiable, type-safe and pointer-safe sequence of instructions. The software program can be received in a resource-constrained device having, for example, either limited memory or based on a limited architecture. The sequence of instructions then can be executed on the resource-constrained device. In some implementations, the software program can be accessed over a computer network such as the Internet prior to downloading it onto the device. When the program is downloaded to the resource-constrained device, constant pool indices that appear in the received set of instructions can be transformed to corresponding data values.

Various implementations include one or more of the following advantages. By supporting many, although not all, of the features of the Java language and by using the same semantics as the Java class files, platform-independent virtual machine code can be written to be executed by a smart card or other resource-constrained device.

The instruction set can inline certain data, which would otherwise appear as part of a constant pool, directly into operation codes or operands. Thus, the instruction set itself can incorporate certain information that would otherwise be stored in and obtained from a constant pool if one were using the Java class file format. By inlining some of the information directly into the instruction set, the size of the constant pool can be reduced, which can help reduce the amount of memory required to store the constant pool and can improve the execution speed of the bytecode. In some cases, inlining the information directly into an operation code can reduce the number of operands required for a particular instruction. Further inlining of information from a constant pool when the program is downloaded to the resource-constrained device can either eliminate the need to retain the constant pool on the device or reduce the size of the constant pool.

Other features such as composite instructions for performing operations on the current object and the explicit handling of 16-bit arithmetic can further reduce the length of a bytecode program.

Other features and advantages will be readily apparent from the following detailed description, the accompanying drawings and the claims.

BRIEF DESCRIPTION OF THE DRAWINGS

FIGS. 4A and 4B are tables of an exemplary set of operation codes for the virtual machine listed in numerical order by operation code and in alphabetical order by mnemonic, respectively.

FIG. 5 is a list of data types which are supported by operation codes that exist for multiple data types according to the invention.

FIG. 6A illustrates the format of an "iipush" instruction according to the invention, and FIG. 6B illustrates the format of a corresponding "ldc" instruction in the Java class file format.

FIG. 7A illustrates the format of a "checkcast" instruction in the Java class file format, and FIG. 7B illustrates the format of a "checkcast" instruction according to the invention.

FIG. 8A illustrates the format of a family of "getfield_T" instructions according to the invention, and FIG. 8B illustrates the format of a corresponding "getfield" instruction in the Java class file format.

FIG. 11A illustrates bytecodes for carrying out a mathematical expression using the Java class file format, and FIG. 11B illustrates bytecodes for carrying out the same mathematical expression according to the invention.

FIG. 12 is partial, non-exclusive list of resource-constrained devices with which the invention can be used.

DESCRIPTION

A verifiable, object-based, type-safe and pointer-safe instruction set is described below for application software programs which can be downloaded to and executed on a range of resource-constrained devices. Resource-constrained devices are generally considered to be those that are relatively restricted in memory and/or computing power or speed, as compared to conventional desktop computers and the like. Although the particular implementation discussed below is described in reference to a smart card, the invention can be used with other resource-constrained devices including, but not limited to, cellular telephones, boundary scan devices, field programmable devices, personal digital assistants (PDAs) and pagers, as well as other miniature or small footprint devices.

Programs written with the instruction set described below are capable of being downloaded to and executed on resource-constrained devices having about sixty-four kilo-bytes (64K) of RAM or less. Some of the resource-constrained devices in which such programs can be executed may have no more than about sixteen kilo-bytes (16K) of RAM and others may have no more than about four kilo-bytes (4K) of RAM. Many of the devices also have limited amounts of other memory, such as no more than about twenty-four kilo-bytes (24K) of ROM, or no more than about 16K of non-volatile memory such as EEPROM. Similarly, some resource-constrained devices are based on an architecture designed for fewer than 32 bits. For example, some of the devices which can be used with the invention are based on an 8-bit or 16-bit architecture, rather than a 32-bit architecture. Of course, applications using the instruction set described below are upward compatible and can be executed, for example, on other Java platforms provided equivalent device support is present.

Figure 1:
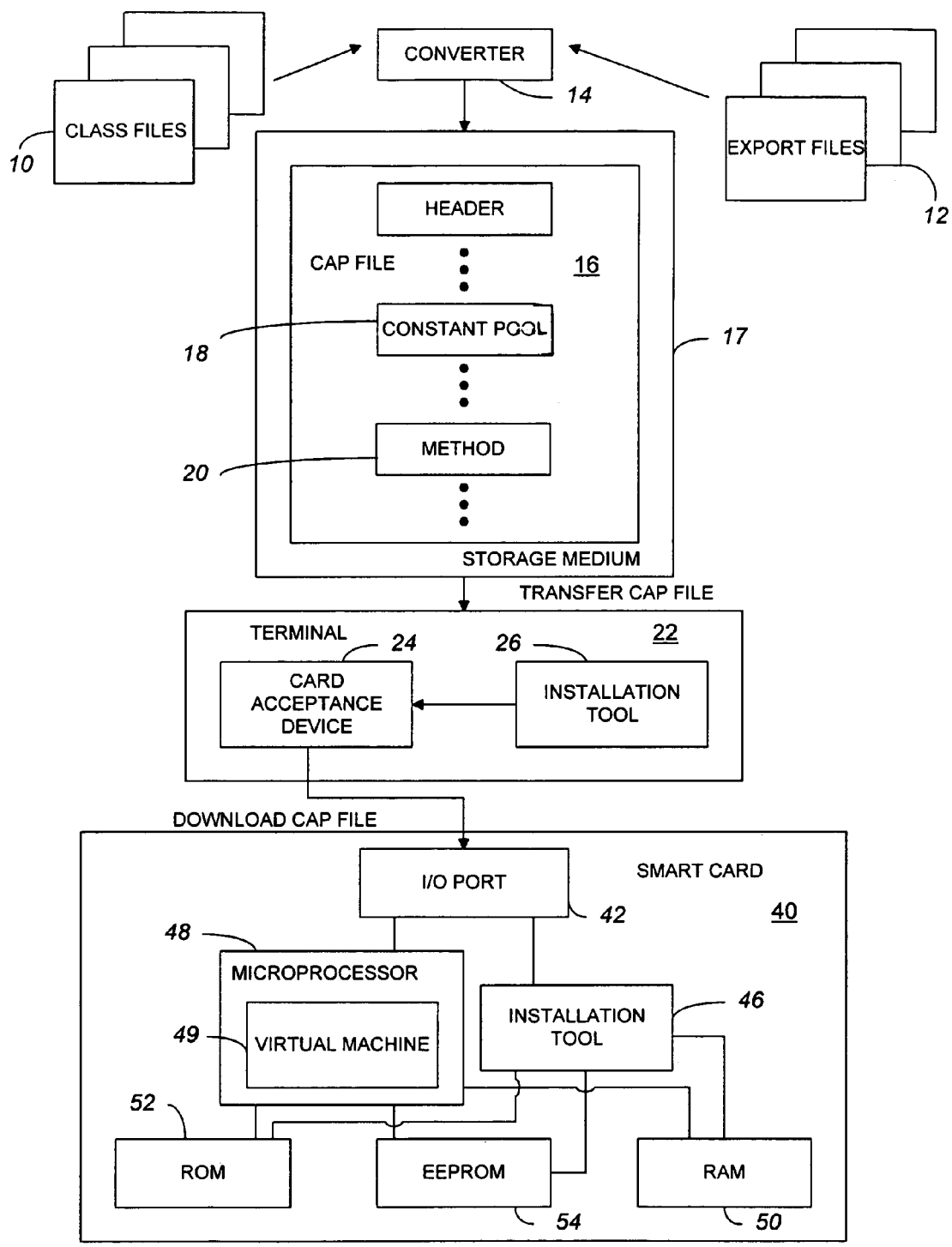
FIG. 1 illustrates an exemplary system including a virtual machine residing on a smart card according to the invention.
Figure 2:
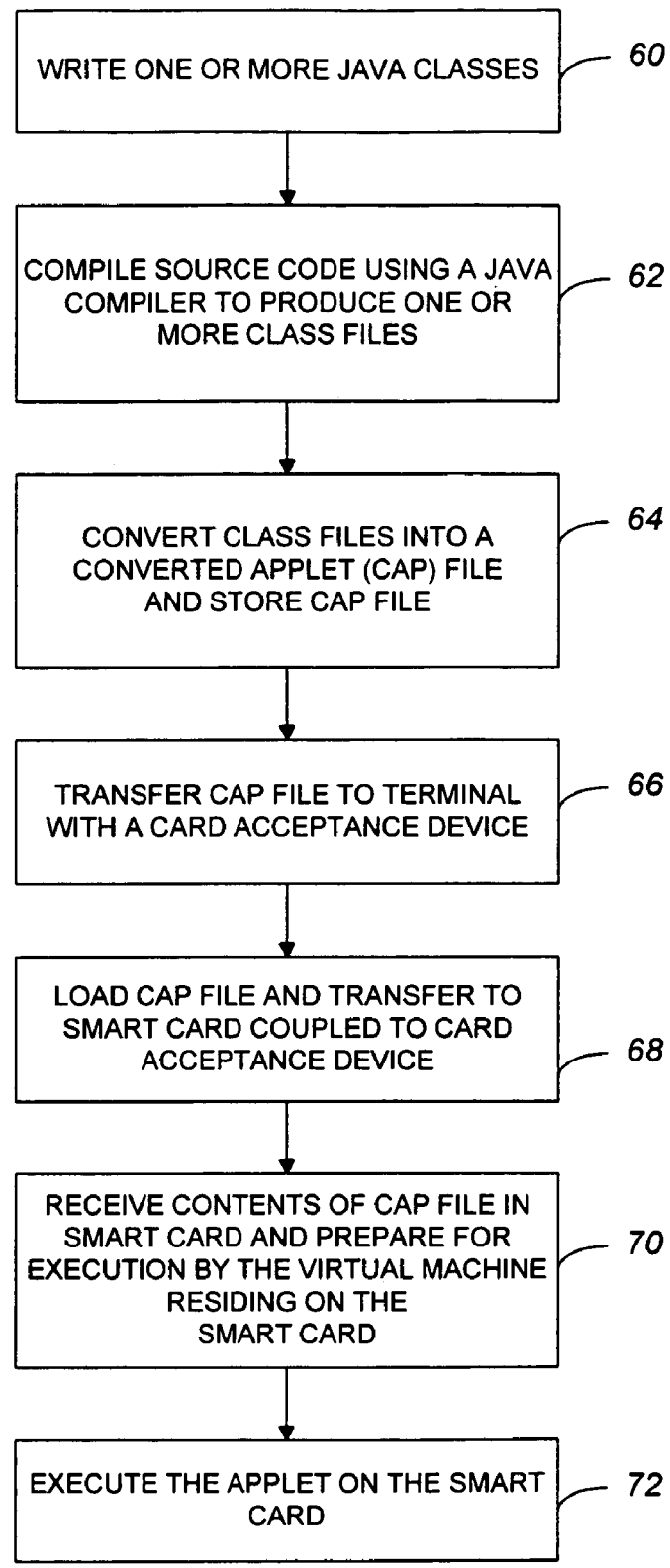
FIG. 2 is a flow chart illustrating a method of providing executable code to a smart card according to the invention.

Referring to FIGS. 1 and 2, development of an applet for a resource-constrained device, such as a smart card 40, begins in a manner similar to development of other Java programs. In other words, a developer writes one or more JAVA classes (step 60) and compiles the source code with a JAVA compiler to produce one or more class files 10 (step 62). The applet can be run, tested and debugged, for example, on a workstation using simulation tools to emulate the environment on the card 40. When the applet is ready to be downloaded to the card 40, the class files 10 are converted to a converted applet (CAP) file 16 by a converter 14 (step 64). The converter 14 can be implemented as a Java application being executed by a desktop computer. The converter 14 can accept as its input one or more export files 12 in addition to the class files 10 to be converted. An export file 12 contains naming or linking information for the contents of other packages that are imported by the classes being converted.

In general, the CAP file 16 includes all the classes and interfaces defined in a single Java package and is represented by a stream of 8-bit bytes. All 16-bit and 32-bit quantities are constructed by reading in two or four consecutive 8-bit bytes, respectively. Among other things, the CAP file 16 includes a constant pool component 18 which is packaged separately from a method component 20. The constant pool component 18 can include various types of constants, ranging from numerical literals known at compile time to method and field references which are resolved either when the program is downloaded to the smart card 40 or at the time of execution by the smart card. The method component 20 specifies the set of instructions to be downloaded to the smart card 40 and subsequently executed by the smart card. Further details of the structure of an exemplary CAP file 16 are discussed in the attached Appendix at pages 53 through 94 and in a publication by Sun Microsystems, Inc. entitled "Java Card Runtime Environment (JCRE) 2.1 Specification," (1998) which is incorporated herein by reference in its entirety.

After conversion, the CAP file 16 can be stored on a computer-readable medium 17 such as a hard drive, a floppy disk, an optical storage medium, a flash device or some other suitable medium.

The CAP file 16 then can be copied or transferred to a terminal 22 (step 66) such as a desktop computer with a peripheral card acceptance device (CAD) 24. In some embodiments, the terminal 22 can be connected to a network (not shown), such as the Internet, a local area network (LAN) or a wide area network (WAN), which communicates with other computing devices such as a server. In such situations, the CAP file 16 can be accessed and transmitted to the terminal 22 over the network. The CAP file 16 also can be provided to the terminal 22 using a carrier wave, such as a network data transmission.

The CAD 24 allows information to be written to and retrieved from the smart card 40. The CAD 24 includes a card port (not shown) into which the smart card 40 can be inserted. Once inserted, contacts from a connector press against the surface connection area on the smart card 40 to provide power and to permit communications with the smart card, although, in other implementations, contactless communications can be used. The terminal 22 also includes an installation tool 26 which loads the CAP file 16 for transmission to the card 40 (step 68).

The smart card 40 has an input/output (I/O) port 42 which can include a set of contacts through which programs, data and other communications are provided. The card 40 also includes an installation tool 46 for receiving the contents of the CAP file 16 and preparing the applet for execution on the card 40 (step 70). The installation tool 46 can be implemented, for example, as a Java program and can be executed on the card 40. The card 40 also has memory, including volatile memory such as RAM 50. The card 40 also has ROM 52 and non-volatile memory, such as EEPROM 54. The applet prepared by the controller 44 can be stored in the EEPROM 54.

In one particular implementation, the applet is executed by a virtual machine 49 running on a microprocessor 48 (step 72). The virtual machine 49, which can be referred to as the Java Card™ Virtual Machine, need not load or manipulate the CAP file 16. Rather, the Java Card Virtual Machine 49 executes the applet code previously stored as part of the CAP file 16. The division of functionality between the Java Card Virtual Machine 49 and the installation tool 46 allows both the virtual machine and the installation tool to be kept relatively small.

In general, implementations and applets written for a resource-constrained platform such as the smart card 40 follow the standard rules for Java platform packages. The Java Virtual Machine and the Java programming language are described in T. Lindholm et al., The Java Virtual Machine Specification (1997), and K. Arnold et al., The Java Programming Language Second Edition, (1998), which are incorporated herein by reference in their entirety. Application programming interface (API) classes for the smart card platform can be written as Java source files which include package designations, where a package includes a number of compilation units and has a unique name. Package mechanisms are used to identify and control access to classes, fields and methods. The Java Card API allows applications written for one Java Card-enabled platform to run on any other Java Card-enabled platform. Additionally, the Java Card API is compatible with formal international standards such as ISO 7816, and industry-specific standards such as Europay/MasterCard/Visa (EMV).

The smart card platform of the present invention supports dynamically created objects including both class instances and arrays. A class is implemented as an extension or subclass of a single existing class and its members are methods as well as variables referred to as fields. A method declares executable code that can be invoked and that receives a fixed number of values as arguments. Classes also can define or implement Java interfaces. An interface is a reference type whose members are constants and abstract methods.

Figures 3A, 3B:
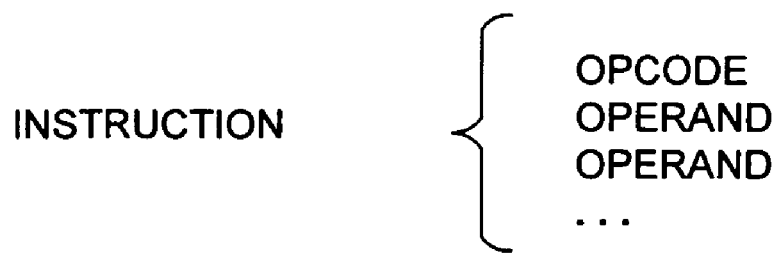
FIGS. 3A and 3B illustrate, respectively, an exemplary format of virtual machine instruction and an inner loop of execution of the virtual machine according to the invention.

Individual instructions stored in the CAP file 16 and subsequently downloaded to the smart card 40 include an 8-bit operation code (opcode) followed by either zero, one or multiple 8-bit operands (FIG. 3A). Some instructions have no operands and consist only of an opcode. The general form of the inner loop of execution of the Java Card Virtual Machine 49 is illustrated in FIG. 3B. When a method is invoked, the Java Card Virtual Machine 49 allocates a frame which has a set of local variables and contains an operand stack. Many of the operation codes discussed below take one or more values from the operand stack of the current frame, operate on them, and return results to the same stack. The operand stack also is used to pass arguments to methods and receive method results.

Values from the operand stack must be operated upon in ways that are appropriate to their types. The Java Card Virtual Machine 49 supports two kinds of data types: primitive types and reference types. The numeric primitive types supported by the Java Card Virtual Machine 49 are: (1) "byte", whose values are 8-bit signed two's complement integers; (2) "short", whose values are 16-bit signed two's complement integers; and, optionally, (3) "int", whose values are 32-bit signed two's complement integers. The Java Card Virtual Machine 49 also supports a "returnAddress" type, whose values are pointers to the operation codes in the instructions for the virtual machine. The reference types supported by the Java Card Virtual Machine 49 are (1) "class" types; (2) "interface" types; and (3) "array" types. Those reference types are the same as the reference types used in the Java Virtual Machine. The Java Card Virtual Machine 49 is defined in terms of an abstract storage unit, which can be referred to as a word, which is sufficiently large to hold a value of the type "byte," "short," "reference," or "returnAddress." Two words are sufficiently large to hold a value of the type "int." Multiple-byte operand data is encoded in big-endian order, in other words, with the high-order byte first.

Various keywords, which cannot be used as identifiers or names of declared entities, are supported by the Java Card Virtual Machine 49. A list of the supported keywords is provided in the attached Appendix at page 11. The function and use of those keywords is the same as the corresponding keywords in the Java programming language.

The operation codes which form the executable program stored in the method component 20 of the CAP file 16 are designed to use the same semantics as that used in the class files 10 written in the Java language. Thus, for example, mathematical results and class hierarchies are preserved when the converter 14 transforms the Java class files 10 into the CAP file 16. Nevertheless, as will be evident from the following description, a sequence of instructions that can be executed by the Java Card Virtual Machine 49 differs from programs intended solely to be run by a system incorporating the Java Virtual Machine. Some of the differences are due to the more limited support of data types present in the instruction set discussed below. Other differences result from the fact that the instruction set discussed below is designed to be executable by a virtual machine residing on a resource-constrained device. Some details of the instruction set are intended to optimize the size or performance of either the Java Card Virtual Machine 49 or the programs running on it. Such details include inlining constant pool data directly into the operation codes or operands, adding multiple versions of a particular instruction to handle different data types, creating composite instructions for operations on the current object, and explicitly handling 16-bit arithmetic.

Referring to FIGS. 4A and 4B, an exemplary instruction set is provided for programs to be executed by the Java Card Virtual Machine 49. Each instruction is identified by a corresponding operation code (opcode) mnemonic and numerical representation. With the exception of two reserved opcodes, impdep1 and impdep2, all of the opcodes typically can be used in a CAP file such as the CAP file 16. The instructions corresponding to the two reserved opcodes provide backdoors or traps to implementation-specific functionality implemented in software and hardware, respectively. Accordingly, the two reserved opcodes typically do not properly appear in the CAP file 16. They are typically used only in representations of programs that were placed on the smart card 40 by means other than receipt of a CAP file.

As previously mentioned, each instruction includes an operation code followed by zero, one, or more operands. In other words, the instructions have the following general format:

operation code
operand1
operand2
. . .

Each word in the instruction format represents a single 8-bit byte or "bytecode." The instruction's opcode is its numeric representation. Each instruction also has a corresponding mnemonic which is its name. However, only the numeric representation is present in the virtual machine code in a CAP file such as the CAP file 36. Detailed explanations of each instruction including its function and effect on the operand stack appear in the attached Appendix at pages 97 through 215.

Each data manipulation instruction is specific to a particular data type. The instruction set corresponding to the operation codes listed in FIG. 4A supports a subset of the features supported by the Java programming language. By supporting many, although not all, of the features of the Java language and by using the same semantics as the Java class files 10, platform-independent virtual machine code can be written to be executed by the smart card 40 or other resource-constrained device.

As mentioned above, the instruction set for the Java Card Virtual Machine inlines certain data, which would otherwise appear as part of the constant pool 18, directly into the operation codes or operands. Thus, the instruction set itself incorporates certain information that would otherwise be stored in and obtained from a constant pool if one were using the Java class file format. Thus, when the one or more Java class files 10 are converted to the CAP file 16, at least some references to a constant pool are transformed to inline data in the bytecodes associated with the CAP file.

For example, if the virtual machine 49 supports the data type "int," then the "iipush" operation code can be used to push an integer value onto the operand stack. The general format for the "iipush" instruction is illustrated in FIG. 6A, and the format of a corresponding "ldc" instruction from the Java class file format is shown in FIG. 6B. The "ldc" instruction includes the operand "index" which is an unsigned byte that is an index into a constant pool. In contrast, the "iipush" instruction, which is executable by the Java Card Virtual Machine 49, eliminates the need to refer to the constant pool when executing that instruction. Although the "iipush" instruction includes four operands, thereby increasing the length of the instruction, the slightly longer program can be offset by the savings in memory space which is achieved by eliminating the need to store additional information in the constant pool 18.

Similarly, the "checkcast" operation code can be used to check whether an object is of a particular type. The general format for the "checkcast" instruction for the Java Card Virtual Machine 49 is illustrated in FIG. 7A, and the format of a corresponding "checkcast" instruction from the Java class file format is shown in FIG. 7B. The data type for the Java Card Virtual Machine 49 has been inlined directly into the instruction, in contrast to the corresponding Java instruction in which the data type is obtained from a constant pool. By inlining some of the information directly into the instruction set, the size of the constant pool 18 that is stored in the CAP file 16 can be reduced.

The foregoing examples illustrate how the instruction set for the Java Card Virtual Machine 49 inlines some information directly into an operand. In some cases, an additional form of inlining is provided by inlining information that would otherwise be stored in the constant pool 18 directly into an operation code. Thus, for example, the instruction set for the Java Card Virtual Machine adds multiple versions of several instruction to handle different data types so that those instructions appear as members of a family of related instructions which share a single description, format and operand stack diagram. Each instruction in such a family of instructions implicitly specifies the data type in the operation code itself. The table in FIG. 5 provides a list of the data types which are supported by instructions that exist for multiple data types. Wide and composite forms of instructions are not listed. Referring to FIG. 5, a specific instruction, with the data type incorporated into the operation code, is obtained by replacing the "T" in the instruction template in the opcode column by the letter representing the type in the type column. Where the column for a particular instruction is left blank, then no instruction exists supporting the particular operation on that data type. For example, there is a "load" instruction for the data type "short," but there is no "load" instruction for the data type "byte."

With instructions that implicitly incorporate the data type into the operation code, the program can operate more quickly and with less data on the smart card 40 than would otherwise be required. Those advantages arise because the data type is directly encoded in the instructions rather than being obtained from an entry in the constant pool. For example, consider the family of "getfield_T" instructions, which includes the instructions "getfield_a," "getfield_b," "getfield_s" and "getfield_i." The general format of the "getfield_T" instructions for use with the Java Card Virtual Machine 49 is illustrated in FIG. 8A, which contrasts with the format of the corresponding "getfield" instruction in the Java class file format as shown in FIG. 8B. In the instructions for the Java Card Virtual Machine 49 (FIG. 8A), the data type has been inlined not only into the instruction, but it has been inlined directly into the operation code. On the one hand, such features can reduce the amount of information stored in the CAP file 16 and also can reduce the number of operands required for the particular instruction. On the other hand, those features expand the number of distinct operation codes.

Whereas the type of inlining discussed with respect to the "iipush" and "checkcast" opcodes can be advantageous for instructions that tend to be less frequently used, the type of inlining discussed with respect to the "getfield_t" family of instructions can be advantageous particularly for instructions that tend to be used more frequently.

The foregoing examples illustrate how the instruction set for the Java Card Virtual Machine 49 inherently inlines certain information. Another form of inlining information can occur when the CAP file 16 is downloaded to the smart card 40, as explained below.

Figure 9A:
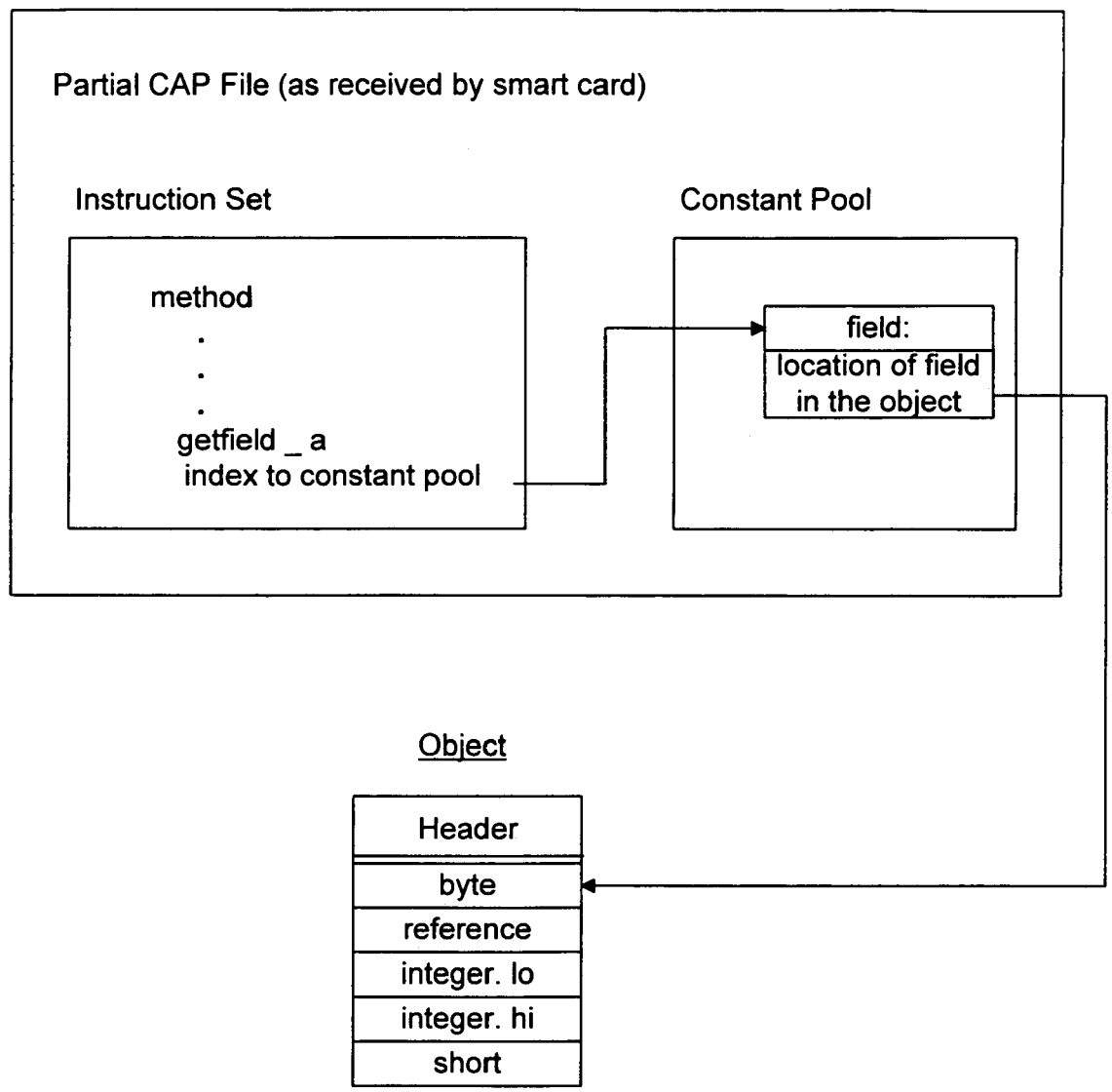
FIGS. 9A and 9B illustrate how an implementation program on the smart card prepares virtual machine code for installation on the smart card according to one embodiment of the invention.
Figure 9B:
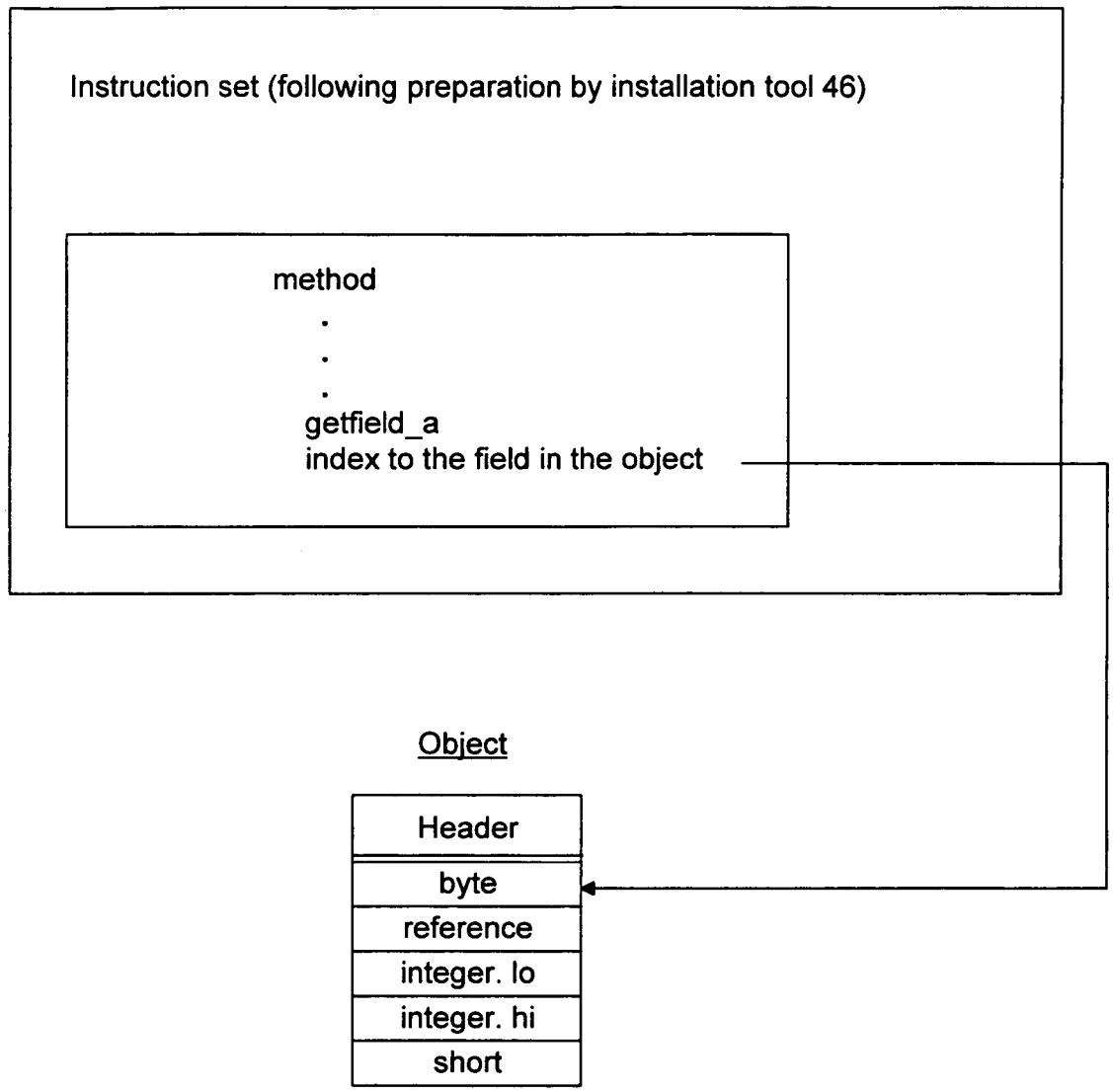

The installation tool 46 on the smart card 40 can be platform-specific and allows the actual storage of the contents of the CAP file 16 to be determined based on the particular platform receiving and preparing the virtual machine code for execution. Thus, in some implementations, the CAP file 16 may be stored on the smart card 40, or other resource-constrained device, in a manner that differs from the manner in which it was received by the smart card. For example, in some cases, when the CAP file 16 is installed on the card 40, the installation tool 46 can link the contents of the CAP file so that the size of the constant pool 18 can be reduced, and in some cases, so that the constant pool need not be retained or stored on the card. That can be accomplished by converting the constant pool indices that appear as part of the code in the CAP file 18 to the corresponding data at the time of installation, as illustrated in FIGS. 9A and 9B. For example, an index to the constant pool 16 can be replaced by an index to the appropriate field in the object. Thus, the virtual machine code stored on the card 40 will already have the data incorporated within it prior to the time of execution. The virtual machine code, with the constant pool 18 removed, reduces some of the indirection inherent in a program which uses a constant pool. The amount of memory required to store the bytecodes on the smart card 40 can, therefore, be reduced, and the execution time for the program also can be reduced. Of course, in other implementations, the installation tool 46 may retain the constant pool 18 when the CAP file 16 is downloaded to the smart card 40.

Figure 10A:
FIGS. 10A and 10B illustrate alternative instructions for obtaining the same result according to the invention.
Figure 10B:

As previously mentioned, the instruction set for the Java Card Virtual Machine also includes composite instructions for performing operations on the current object. In other words, some of the instructions that are executable by the Java Card Virtual Machine 49 allow multiple instructions to be collapsed into a single instruction. In particular, instructions that include a "this" operation, such as the family of "getfield_T_this" instructions and the family of "putfield_T_this" instructions, effectively concatenate multiple instructions. In general, the "this" operation operates on the current object. For example, to fetch a field from the current object, one could use a combination of the "aload_0" instruction and a "getfield_a" instruction as shown in FIG. 10A. Alternatively, one can use the single instruction "getfield_T_this" as illustrated in FIG. 10B. Use of the latter instruction can result in a smaller and faster program code. As previously noted, such features are particularly advantageous in resource-constrained devices such as the smart card 40.

The instruction set for the Java Card Virtual Machine also handles 16-bit arithmetic explicitly. To illustrate how 16-bit arithmetic is handled, consider a situation in which "a," "b" and "c" have been declared as "short" type variables, and the expression "c=(short) a+b;" is to be compiled. The bytecodes written in the Java class file format are shown in FIG. 11A. As can be seen from FIG. 11A, five opcodes are used to load the values "a" and "b," to add the values "a" and "b," to convert the resulting integer type into a short type, and to store the result. In contrast, only four opcodes are needed to obtain and store the result using the instruction set for the Java Card Virtual Machine 49 which obviates the need to convert the integer type result into a short type. Furthermore, in addition to using fewer bytecodes, the size of the stack can be reduced by as much as fifty percent because the Java Card Virtual Machine operates on 16-bit quantities rather than 32-bit quantities.

An object-oriented, verifiable instruction set is, therefore, provided and allows a file with virtual machine bytecode to be stored on a computer-readable medium. Such a file can be downloaded to the resource-constrained device so that the bytecode can be executed by the resource-constrained device.

Although a virtual machine 49 running on a microprocessor 48 has been described as one implementation for executing the bytecodes on the smart card 40, in alternative implementations, an application-specific integrated circuit (ASIC), or a combination of hardware and firmware can be used as a controller for executing downloaded code instead.

Furthermore, although the invention can be implemented using the operation codes listed in FIGS. 4A and 4B, other operation codes and corresponding instruction sets having certain characteristics are suited for implementing the invention as well. Such characteristics include verifiability, type safety, pointer safety, object-oriented, dynamically linked, virtual machine-based, platform-independence, and use of the same semantics as the Java language, although not all of those characteristics need to be present in a particular implementation.

As previously discussed, the Java Card instruction set can be used with a variety of different resource-constrained devices, some of which are listed in FIG. 12.

Other implementations are within the scope of the following claims.

What is claimed is:

1. A computer-implemented method for converting and transforming an application software program to generate an object-oriented, verifiable, type-safe and pointer-safe sequence of instructions, said instructions comprising operation codes and operands, said sequence of instructions operable to be loaded to and executed by a resource-constrained device, said sequence of instructions converted from at least one class file, the method comprising:
   (A) analyzing instructions from said at least one class file and any associated references to a constant pool and arithmetic operations having 32-bit operands; and
   (B) removing said references to the constant pool and transforming said 32-bit operands based upon said analyzing by:
      (i) transforming at least one reference, of at least one of said instructions, to information in a constant pool by inlining directly at least one additional operand to said at least one instruction, wherein said at least one additional operand specifies a data type;
      (ii) replacing an operation code of another of said instructions, which accesses an entry in said constant pool to obtain a data type that was any one of a plurality of data types, with another operation code selected from a family of operation codes, wherein
         (a) each said another operation code in said family is for a different one of said plurality of data types so that the data type is explicit for said each said another operation code in said family; and
         (b) said another operation code represents said family for said entry in said constant pool; and
      (iii) transforming 32-bit operands for arithmetic operations such that arithmetic instructions are explicitly defined as using 16-bit operands wherein upon execution of said arithmetic instructions by a virtual machine on the resource-constrained device, only 16-bit operands are loaded onto a stack; and
   wherein the instructions formed by replacement and transformation according to (i), (ii), (iii) are directly executable by the virtual machine on said resource-constrained device without any other intermediate stage of reconversion or referencing.

2. The method of claim 1 wherein said resource-constrained device is based on a 16-bit processor architecture.

3. The method of claim 1 wherein said resource-constrained device is based on an 8-bit processor architecture.

4. The method of claim 1 wherein said resource-constrained device comprises a random access memory with a capacity of no more than about 64 kilobytes.

5. The method of claim 1 wherein said resource-constrained device comprises a random access memory with a capacity of no more than about 4 kilobytes.

6. The method of claim 1 wherein said resource-constrained device comprises a smart card.

7. The method of claim 1 wherein said resource-constrained device comprises an application-specific integrated circuit (ASIC).

8. A computer-implemented method for converting and transforming an application software program to generate an object-oriented, verifiable, type-safe and pointer-safe sequence of instructions, said instructions comprising operation codes and operands, said sequence of instructions operable to be loaded to and executed by a resource-constrained device, said instructions previously converted from at least one class file, the method comprising:
   (1) analyzing instructions from said at least one class file to identify (a) plurality of instructions that can be collapsed into a single instruction and (b) instructions including arithmetic operations having 32-bit operands; and
   (2) substituting said single instruction for said plurality of instructions that can be collapsed and transforming said 32-bit operands based upon said analyzing by:
      (A) substituting at least one composite instruction for performing an operation on a current object for said plurality of instructions being collapsed, wherein
         (i) a first instruction in said plurality of instructions being collapsed is any one of a family of instructions, wherein
            (a) each instruction in said family is for a different one of a plurality of data types so that the data type is explicit for each instruction in said family; and
         (ii) a second instruction in said plurality of instructions being collapsed is not from said family of instructions; and
      (B) transforming 32-bit operands for arithmetic operations such that arithmetic instructions are explicitly defined as using 16-bit operands wherein upon execution of said arithmetic instructions by a virtual machine on the resource-constrained device, only 16-bit operands are loaded onto a stack; and
   wherein the instructions formed by substitution and transformation according to (A), (B) are directly executable by the virtual machine on said resource-constrained device without any other intermediate stage of reconversion or referencing.

9. The method of claim 8 wherein said resource-constrained device is based on a 16-bit processor architecture.

10. The method of claim 8 wherein said resource-constrained device is based, on an 8-bit processor architecture.

11. The method of claim 8 wherein said resource-constrained device comprises a random access memory with a capacity of no more than about 64 kilo-bytes.

12. The method of claim 8 wherein said resource-constrained device comprises a random access memory with a capacity of no more than about 4 kilo-bytes.

13. The method of claim 8 wherein said resource-constrained device comprises a smart card.

14. The method of claim 8 wherein said resource-constrained device comprises an application-specific integrated circuit (ASIC).

15. A resource-constrained device comprising:
   a virtual machine implemented on a microprocessor, said virtual machine configured to execute an object-oriented, verifiable, type-safe and pointer-safe sequence of instructions; and
   a memory, coupled to said virtual machine, having stored therein said object-oriented, verifiable, type-safe and pointer-safe sequence of instructions, said instructions comprising operation codes and operands, said sequence of instructions previously converted from at least one class file by a method comprising:

(A) analyzing instructions from said at least one class file and any associated references to a constant pool and arithmetic operations having 32-bit operands; and (B) removing said references to the constant pool and transforming said 32-bit operands based upon said analyzing by:

(i) transforming at least one reference, of at least one of said instructions, to information in a constant pool by inlining directly at least one additional operand to said at least one instruction, wherein said at least one additional operand specifies a data type:

(ii) replacing an operation code of another of said instructions, which accesses an entry in said constant pool to obtain a data type that was any one of a plurality of data types, with another operation code selected from a family of operation codes, wherein (a) each said another operation code in said family is for a different one of said plurality of data types so that the data type is explicit for said each said another operation code in said family; and (b) said another operation code represents said family for said entry in said constant pool; and (iii) transforming 32-bit operands for arithmetic operations such that arithmetic instructions are explicitly defined as using 16-bit operands wherein upon execution of said arithmetic instructions by a virtual machine on the resource-constrained device, only 16-bit operands are loaded onto a stack; and wherein the instructions formed by replacement and transformation according to (i), (ii), (iii) are directly executable by the virtual machine on said resource-constrained device without any other intermediate stage of reconversion or referencing.

16. The resource-constrained device of claim 15 wherein said resource-constrained device is based on a 16-bit processor architecture.

17. The resource-constrained device of claim 15 wherein said resource-constrained device is based on an 8-bit processor architecture.

18. The resource-constrained device of claim 15 wherein said resource-constrained device comprises a random access memory with a capacity of no more than about 64 kilo-bytes.

19. The resource-constrained device of claim 15 wherein said resource-constrained device comprises a random access memory with a capacity of no more than about 4 kilo-bytes.

20. The resource-constrained device of claim 15 wherein said resource-constrained device comprises a smart card.

21. The resource-constrained device of claim 15 wherein said resource-constrained device comprises an application-specific integrated circuit (ASIC).

22. The resource-constrained device of claim 15 wherein said resource-constrained device comprises a Java Card™ technology-enabled smart card.

23. A resource-constrained device comprising:

a virtual machine implemented on a microprocessor, in said resource-constrained device, said virtual machine configured to execute an application software program; and a memory, in said resource constrained device, having stored therein said application software program comprising an object-oriented, verifiable, type-safe and pointer-safe sequence of instructions, said instructions comprising operation codes and operands, said instructions previously converted from at least one class file by a method comprising:

(1) analyzing instructions from said at least one class file to identify (a) plurality of instructions that can be collapsed into a single instruction and (b) instructions including arithmetic operations having 32-bit operands; and (2) substituting said single instruction for said plurality of instructions that can be collapsed and transforming said 32-bit operands based upon said analyzing by:

(A) substituting at least one composite instruction for performing an operation on a current object for said plurality of instructions being collapsed, wherein (i) a first instruction in said plurality of instructions being collapsed is any one of a family of instructions, wherein (a) each instruction in said family is for a different one of a plurality of data types so that the data type is explicit for each instruction in said family; and (ii) a second instruction in said plurality of instructions being collapsed is not from said family of instructions; and (B) transforming 32-bit operands for arithmetic operations such that arithmetic instructions are explicitly defined as using 16-bit operands wherein upon execution of said arithmetic instructions by a virtual machine on the resource-constrained device, only 16-bit operands are loaded onto a stack; and wherein the instructions formed by substitution and transformation according to (A), (B) are directly executable by the virtual machine on said resource constrained device without any other intermediate stage of reconversion or referencing.

24. The resource-constrained device of claim 23 wherein said resource-constrained device is based on a 16-bit processor architecture.

25. The resource-constrained device of claim 23 wherein said resource-constrained device is based on an 8-bit processor architecture.

26. The resource-constrained device of claim 23 wherein said resource-constrained device comprises a random access memory with a capacity of no more than about 64 kilo-bytes.

27. The resource-constrained device of claim 23 wherein said resource-constrained device comprises a random access memory with a capacity of no more than about 4 kilo-bytes.

28. The resource-constrained device of claim 23 wherein said resource-constrained device comprises a smart card.

29. The resource-constrained device of claim 23 wherein said resource-constrained device comprises an application-specific integrated circuit (ASIC).

30. The resource-constrained device of claim 23 wherein said resource-constrained device comprises a Java Card™ technology-enabled smart card.

31. A method for using an application software program including an object-oriented, verifiable, type-safe and pointer-safe sequence of instructions, the method comprising:

receiving said software program in a resource-constrained device having a memory and storing said sequence of instructions therein, said instructions comprising operation codes and operands, said sequence of instructions previously converted from at least one class file by a method comprising:
  (A) analyzing instructions from said at least one class file and any associated references to a constant pool and arithmetic operations having 32-bit operands; and
  (B) removing said references to the constant pool and transforming said 32-bit operands based upon said analyzing by:
    (i) transforming at least one reference, of at least one of said instructions, to information in a constant pool by inlining directly at least one additional operand to said at least one instruction, wherein said at least one additional operand specifies a data type;
    (ii) replacing an operation code of another of said instructions which accesses an entry in said constant pool to obtain a data type that was any one of a plurality of data types, with another operation code selected from a family of operation codes, wherein
      (a) each said another operation code in said family is for a different one of said plurality of data types so that the data type is explicit for said each said another operation code in said family; and
      (b) said another operation code represents said family for said entry in said constant pool; and
    (iii) transforming 32-bit operands for arithmetic operations such that arithmetic instructions are explicitly defined as using 16-bit operands wherein upon execution of said arithmetic instructions by a virtual machine on the resource-constrained device, only 16-bit operands are loaded onto a stack; and
  wherein the instructions formed by replacement and transformation according to (i), (ii), (iii) are directly executable by the virtual machine on said resource constrained device without any other intermediate stage of reconversion or referencing; and
  executing said sequence of instructions on said resource-constrained device using said virtual machine.

32. The method of claim 31, further comprising accessing said software program over a computer network prior to downloading said program onto said resource-constrained device.

33. The method of claim 31, further comprising accessing said software program over the Internet prior to downloading said program onto said resource-constrained device.

34. The method of claim 31 wherein said resource-constrained device is based on a 16-bit processor architecture.

35. The method of claim 31 wherein said resource-constrained device is based on an 8-bit processor architecture.

36. The method of claim 31 wherein said memory comprises a random access memory with a capacity of no more than about 64 kilo-bytes.

37. The method of claim 31 wherein said memory comprises a random access memory with a capacity of no more than about 4 kilo-bytes.

38. The method of claim 31 wherein said resource-constrained device comprises a smart card.

39. The method of claim 31 wherein said resource-constrained device comprises an application-specific integrated circuit (ASIC).

40. A method for using an application software program including an object-oriented, verifiable, type-safe and pointer-safe sequence of instructions, the method comprising:
  receiving said software program in a resource-constrained device having a memory, said instructions comprising operation codes and operands, said instructions previously converted from at least one class file by a method comprising:
    (1) analyzing instructions from said at least one class file to identify (a) plurality of instructions that can be collapsed into a single instruction and (b) instructions including arithmetic operations having 32-bit operands; and
    (2) substituting said single instruction for said plurality of instructions that can be collapsed and transforming said 32-bit operands based upon said analyzing by:
      (A) substituting at least one composite instruction for performing an operation on a current object for said plurality of instructions being collapsed wherein
        (i) a first instruction in said plurality of instructions being collapsed is any one of a family of instructions, wherein
          (a) each instruction in said family is for a different one of a plurality of data types so that the data type is explicit for each instruction in said family; and
        (ii) a second instruction in said plurality of instructions being collapsed is not from said family of instructions; and
      (B) transforming 32-bit operands for arithmetic operations such that arithmetic instructions are explicitly defined as using 16-bit operands wherein upon execution of said arithmetic instructions by a virtual machine on the resource-constrained device, only 16-bit operands are loaded onto a stack; and
    wherein the instructions formed by substitution and transformation according to (A), (B) are directly executable by the virtual machine on said resource constrained device without any other intermediate stage of reconversion or referencing; and
  executing said sequence of instructions on said resource-constrained device.

41. The method of claim 40, further comprising accessing said software program over a computer network prior to downloading said program onto said resource-constrained device.

42. The method of claim 40, further comprising storing said sequence of instructions on said resource-constrained device.

43. The method of claim 40, further comprising accessing said software program over the Internet prior to downloading said program onto said resource-constrained device.

44. The method of claim 40 wherein said resource-constrained device is based on a 16-bit processor architecture.

45. The method of claim 40 wherein said resource-constrained device is based on an 8-bit processor architecture.

46. The method of claim 40 wherein said memory comprises a random access memory with a capacity of no more than about 64 kilo-bytes.

47. The method of claim 40 wherein said memory comprises a random access memory with a capacity of no more than about 4 kilo-bytes.

48. The method of claim 40 wherein said resource-constrained device comprises a smart card.

49. The method of claim 40 wherein said resource-constrained device comprises an application-specific integrated circuit (ASIC).

50. An apparatus for using an application software program including an object-oriented, verifiable, type-safe and pointer-safe sequence of instructions, the apparatus comprising:

means for receiving said software program in a resource-constrained device having a memory, said instructions comprising operation codes and operands, said sequence of instructions previously converted from at least one class file by a method comprising:

(A) analyzing instructions from said at least one class file and any associated references to a constant pool and arithmetic operations having 32-bit operands; and (B) removing said references to the constant pool and transforming said 32-bit operands based upon said analyzing by:

(i) transforming at least one reference, of at least one of said instructions, to information in a constant pool by inlining directly at least one additional operand to said at least one instruction, wherein said at least one additional operand specifies a data type;

(ii) replacing an operation code of another of said instructions, which accesses an entry in said constant pool to obtain a data type that was any one of a plurality of data types, with another operation code selected from a family of operation codes, wherein (a) each said another operation code in said family is for a different one of said plurality of data types so that the data type is explicit for said each said another operation code in said family; and (b) said another operation code represents said family for said entry in said constant pool and (iii) transforming 32-bit operands for arithmetic operations such that arithmetic instructions are explicitly defined as using 16-bit operands wherein upon execution of said arithmetic instructions by a virtual machine on the resource-constrained device, only 16-bit operands are loaded onto a stack; and wherein the instructions formed by replacement and transformation according to (i), (ii), (iii) are directly executable by the virtual machine on said resource constrained device without any other intermediate stage of reconversion or referencing; and means for executing said sequence of instructions on said resource-constrained device.

51. The apparatus of claim 50, further comprising means for accessing said software program-over a computer network prior to downloading said program onto said resource-constrained device.

52. The apparatus of claim 50, further comprising means for storing said sequence of instructions on said resource-constrained device.

53. The apparatus of claim 50, further comprising means for accessing said software program over the Internet prior to downloading said program onto said resource-constrained device.

54. The apparatus of claim 50 wherein said resource-constrained device is based on a 16-bit processor architecture.

55. The apparatus of claim 50 wherein said resource-constrained device is based on an 8-bit processor architecture.

56. The apparatus of claim 50 wherein said memory comprises a random access memory with a capacity of no more than about 64 kilo-bytes.

57. The apparatus of claim 50 wherein said memory comprises a random access memory with a capacity of no more than about 4 kilo-bytes.

58. The apparatus of claim 50 wherein said resource-constrained device comprises a smart card.

59. The apparatus of claim 50 wherein said resource-constrained device comprises an application-specific integrated circuit (ASIC).

60. An apparatus for using an application software program including an object-oriented, verifiable, type-safe and pointer-safe sequence of instructions, the apparatus comprising:

means for receiving said software program in a resource-constrained device having a memory, said instructions comprising operation codes and operands, said instructions previously converted from at least one class file by a method comprising:

(1) analyzing instructions from said at least one class file to identify (a) plurality of instructions that can be collapsed into a single instruction and (b) instructions including arithmetic operations having 32-bit operands; and (2) substituting said single instruction for said plurality of instructions that can be collapsed and transforming said 32-bit operands based upon said analyzing by:

(A) substituting at least one composite instruction for performing an operation on a current object for said plurality of instructions being collapsed, wherein (i) a first instruction in said plurality of instructions being collapsed is any one of a family of instructions, wherein (a) each instruction in said family is for a different one of a plurality of data types so that the data type is explicit for each instruction in said family; and (ii) a second instruction in said plurality of instructions being collapsed is not from said family of instructions; and (B) transforming 32-bit operands for arithmetic operations such that arithmetic instructions are explicitly defined as using 16-bit operands wherein upon execution of said arithmetic instructions by a virtual machine on the resource-constrained device, only 16-bit operands are loaded onto a stack; and wherein the instructions formed by substitution and transformation according to (A), (B) are directly executable by the virtual machine on said resource constrained device without any other intermediate stage of reconversion or referencing; and means for executing said sequence of instructions on said resource-constrained device.

61. The apparatus of claim 60, further comprising means for accessing said software program over a computer network prior to downloading said program onto said resource-constrained device.

62. The apparatus of claim 60, further comprising means for storing said sequence of instructions on said resource-constrained device.

63. The apparatus of claim 60, further comprising means for accessing said software program over the Internet prior to downloading said program onto said resource-constrained device.

64. The apparatus of claim 60 wherein said resource-constrained device is based on a 16-bit processor architecture.

65. The apparatus of claim 60 wherein said resource-constrained device is based on an 8-bit processor architecture.

66. The apparatus of claim 60 wherein said memory comprises a random access memory with a capacity of no more than about 64 kilo-bytes.

67. The apparatus of claim 60 wherein said memory comprises a random access memory with a capacity of no more than about 4 kilo-bytes.

68. The apparatus of claim 60 wherein said resource-constrained device comprises a smart card.

69. The apparatus of claim 60 wherein said resource-constrained device comprises an application-specific integrated circuit (ASIC).

* * * * *